United States Patent
Reboul et al.

(10) Patent No.: US 8,940,812 B2
(45) Date of Patent: Jan. 27, 2015

(54) SILICONE POLYMERS COMPRISING SULFONIC ACID GROUPS

(71) Applicant: Johnson & Johnson Vision Care, Inc., Jacksonville, FL (US)

(72) Inventors: Adam C. Reboul, Sarasota, FL (US); Shivkumar Mahadevan, Orange Park, FL (US); Michelle Carman Turnage, Jacksonville, FL (US)

(73) Assignee: Johnson & Johnson Vision Care, Inc., Jacksonville, FL (US)

(*) Notice: Subject to any disclaimer, the term of this patent is extended or adjusted under 35 U.S.C. 154(b) by 0 days.

(21) Appl. No.: 13/734,775

(22) Filed: Jan. 4, 2013

(65) Prior Publication Data

US 2013/0184372 A1    Jul. 18, 2013

Related U.S. Application Data

(60) Provisional application No. 61/587,288, filed on Jan. 17, 2012.

(51) Int. Cl.

| | | |
|---|---|---|
| C08L 83/04 | (2006.01) | |
| C08L 83/00 | (2006.01) | |
| C08L 83/12 | (2006.01) | |
| C08F 218/00 | (2006.01) | |
| C08F 228/02 | (2006.01) | |

(52) U.S. Cl.
CPC .............. C08F 228/02 (2013.01); C08L 83/04 (2013.01)
USPC .......................... 523/107; 526/279; 524/547

(58) Field of Classification Search
None
See application file for complete search history.

(56) References Cited

U.S. PATENT DOCUMENTS

| | | | |
|---|---|---|---|
| 3,408,429 | A | 10/1968 | Wichterle |
| 3,660,545 | A | 5/1972 | Wichterle |
| 3,808,178 | A | 4/1974 | Gaylord |
| 4,113,224 | A | 9/1978 | Clark |
| 4,120,570 | A | 10/1978 | Gaylord |
| 4,136,250 | A | 1/1979 | Mueller |
| 4,153,641 | A | 5/1979 | Deichert |
| 4,197,266 | A | 4/1980 | Clark |
| 4,740,533 | A | 4/1988 | Su |
| 4,910,277 | A | 3/1990 | Bambury |
| 5,011,275 | A | 4/1991 | Mueller |
| 5,034,461 | A | 7/1991 | Lai |
| 5,070,215 | A | 12/1991 | Bambury |
| 5,244,981 | A | 9/1993 | Seidner |
| 5,314,960 | A | 5/1994 | Spinelli |
| 5,321,108 | A | 6/1994 | Kunzler |
| 5,331,067 | A | 7/1994 | Seidner |
| 5,371,147 | A | 12/1994 | Spinelli |
| 5,387,662 | A | 2/1995 | Kunzler |
| 5,451,617 | A | 9/1995 | Lai |
| 5,539,016 | A | 7/1996 | Kunzler |
| 5,962,548 | A | 10/1999 | Vanderlaan |
| 5,998,498 | A | 12/1999 | Vanderlaan |
| 6,020,445 | A | 2/2000 | Vanderlaan |
| 6,367,929 | B1 | 4/2002 | Maiden |
| 6,822,016 | B2 | 11/2004 | McCabe |
| 7,249,848 | B2 | 7/2007 | Laredo |
| 7,786,185 | B2 | 8/2010 | Rathore |
| 7,807,852 | B2 | 10/2010 | Ricks-Laskoski |
| 2002/0016383 | A1 | 2/2002 | Iwata |
| 2003/0125498 | A1 | 7/2003 | McCabe |
| 2003/0162862 | A1 | 8/2003 | McCabe |
| 2004/0208983 | A1 | 10/2004 | Hill |
| 2006/0116495 | A1 | 6/2006 | Stark et al. |
| 2008/0114123 | A1 | 5/2008 | Tighe |
| 2009/0093596 | A1 | 4/2009 | Salamone |
| 2010/0010165 | A1 | 1/2010 | Hashemzadeh |
| 2010/0280146 | A1 | 11/2010 | Vanderlaan |
| 2011/0163254 | A1 | 7/2011 | Stark |
| 2011/0237766 | A1 | 9/2011 | Maggio |
| 2013/0184372 | A1 * | 7/2013 | Reboul et al. .................. 523/107 |

FOREIGN PATENT DOCUMENTS

| | | | |
|---|---|---|---|
| EP | 80539 B1 | 5/1986 | |
| WO | 93005085 A1 | 3/1993 | |
| WO | WO 9305085 A1 * | 3/1993 | ............ C08F 230/08 |
| WO | WO 9631792 A1 | 10/1996 | |
| WO | WO 03022321 A2 | 3/2003 | |
| WO | WO 03022322 A2 | 3/2003 | |

OTHER PUBLICATIONS

PCT International Search Report, dated Apr. 25, 2013, for PCT Int'l Appln. No. PCT/US2013/021358.
Cavicchi, Kevin A., Synthesis and Polymerization of Substituted Ammonium Sulfonate Monomers for Advanced Materials Applications, ACS Applied Materials and Interfaces 2012, 4, 518-526.
Ibrhahim, Hisham Radwan, et al., Antimicrobial Effects of Lysozyme against Gram-Negative Bacteria Due to Covalent Binding of Palmitic Acid, J. Agric Food Chem., 1991, 39, 2077-2082.
Volume III, Photoinitiators for Free Radical Cationic & Anionic Photopolymerization, $2^{nd}$ Edition by J.V. Crivello & K. Dietliker; edited by G. Bradley; John Wiley and Sons; New York; 1998.
PCT International Preliminary Report on Patentability, dated Jul. 31, 2014, for PCT Int'l Appln. No. PCT/US2013/021358.

* cited by examiner

*Primary Examiner* — James J Seidleck
*Assistant Examiner* — Peter A Salamon
(74) *Attorney, Agent, or Firm* — Karen A. Harding

(57) ABSTRACT

The present invention relates to a silicone polymer comprising a sulfonic acid component formed from reactive components comprising (i) at least one silicone component and (ii) at least one sulfonic acid-containing component, wherein the sulfonic acid-containing component is comprised of a non-polymerizable, hydrophobic cation and a polymerizable sulfonic acid.

19 Claims, No Drawings

SILICONE POLYMERS COMPRISING SULFONIC ACID GROUPS

RELATED APPLICATIONS

This application claims priority to U.S. Provisional Patent Application No. 61/587,288, filed on Jan. 17, 2012 entitled SILICONE POLYMERS COMPRISING SULFONIC ACID GROUPS, the contents of which are incorporated by reference.

FIELD OF THE INVENTION

The present invention relates to silicone polymers/silicone hydrogels and ophthalmic devices, such as contact lenses formed therefrom.

BACKGROUND OF THE INVENTION

Soft contact lenses can generally be classified into two groups: conventional hydrogel contact lenses and silicone hydrogel contact lenses. Conventional hydrogel lenses are typically formed from hydrophilic polymers and copolymers such as those containing repeating units from hydroxyethylmethylacrylate ("HEMA") and methacrylic acid ("MAA"). Contact lenses formed from copolymers of HEMA and MAA, such as ACUVUE® 2™ contact lenses, display substantial amounts of lysozyme uptake. See, e.g., Castillo et al, Biomaterials v 6(5), pp 338-345 (1985) It is believed that the anionic charge of the MAA drives the high adsorption of the cation, a natural protein that exhibits anti-bacterial properties. See, e.g., Ibrhahim et al., J. Agric Food Chem., v 39, pp 2077-2082 (1991). However, one of the biggest drawbacks of conventional hydrogel contact lenses is that they generally have relatively low oxygen permeability.

Silicone hydrogel contact lenses offer an advantage over conventional hydrogel contact lenses in that they improve oxygen permeability, which improves oxygen availability to the cornea. However, silicone monomers are typically not anionic, and thus, do not display substantial amounts of lysozyme uptake. Thus, it would be desirable to add anionic groups to a silicone hydrogel to aid in the adsorption of native lysozyme.

2-Acrylamido-2-methylpropane sulfonic acid ("AMPS") is an anionic monomer that has been incorporated into conventional hydrogel lenses. See, e.g., U.S. Pat. Nos. 5,451,617 and 5,011,275 and US Patent Application No. 2008/0114123. However, Applicants found that upon attempting to incorporate this anionic monomer into a silicone hydrogel, the monomer was not very soluble and resulted in a hazy mixture. The present invention relates to the discovery of a method of incorporating AMPS or other sulfonic acid-containing components in a silicone polymer/hydrogel, which in turn can be used to manufacture silicone hydrogel contact lens having anionic properties and the benefits therefrom.

SUMMARY OF THE INVENTION

In one aspect, the present invention relates to a silicone polymer comprising a sulfonic acid component formed from reactive components comprising (i) at least one silicone component and (ii) at least one sulfonic acid-containing component, wherein the sulfonic acid-containing component is comprised of a non-polymerizable, hydrophobic cation and a polymerizable sulfonic acid.

In another aspect, the present invention relates to silicone hydrogel formed from the reaction mixture comprising (i) at least one silicone component and (ii) at least one sulfonic acid-containing component, wherein the sulfonic acid-containing component is comprised of a non-polymerizable hydrophobic cation and a polymerizable sulfonic acid.

In another aspect, the present invention also relates to a biomedical device (e.g., a contact lens) comprising such silicone polymer and/or such silicone hydrogel.

Other aspects, as well as features and advantages, of the present invention will be apparent from the detailed description of the invention and from the claims.

DETAILED DESCRIPTION OF THE INVENTION

It is believed that one skilled in the art can, based upon the description herein, utilize the present invention to its fullest extent. The following specific embodiments can be construed as merely illustrative, and not limitative of the remainder of the disclosure in any way whatsoever.

Unless defined otherwise, all technical and scientific terms used herein have the same meaning as commonly understood by one of ordinary skill in the art to which the invention belongs. Also, all publications, patent applications, patents, and other references mentioned herein are incorporated by reference.

Definitions

As used herein, a "biomedical device" is any article that is designed to be used while either in or on mammalian tissues or fluid. Examples of these devices include, but are not limited to, catheters, implants, stents, and ophthalmic devices such as intraocular lenses and contact lenses.

As used herein an "ophthalmic device" is any device which resides in or on the eye or any part of the eye, including the cornea, eyelids and ocular glands. These devices can provide optical correction, cosmetic enhancement, vision enhancement, therapeutic benefit (for example as bandages) or delivery of active components such as pharmaceutical and neutriceutical components, or a combination of any of the foregoing. Examples of ophthalmic devices include, but are not limited to, lenses and optical and ocular inserts, including, but not limited to punctal plugs and the like.

As used herein, the term "lens" refers to ophthalmic devices that reside in or on the eye. The term lens includes, but is not limited to soft contact lenses, hard contact lenses, intraocular lenses, and overlay lenses.

In one embodiment, the biomedical devices, ophthalmic devices and lenses of the present invention include silicone polymers or silicone hydrogels. These silicone hydrogels typically contain a silicone component and/or hydrophobic and hydrophilic monomers that are covalently bound to one another in the cured device.

As used herein "reactive mixture" refers to the mixture of components (both reactive and non-reactive) which are mixed together and subjected to polymerization conditions to form the silicone hydrogels of the present invention. The reactive mixture comprises reactive components such as monomers, macromers, prepolymers, cross-linkers, and initiators, and additives such as wetting agents, release agents, dyes, light absorbing compounds such as UV absorbers and photochromic compounds, any of which may be reactive or non-reactive but are capable of being retained within the resulting biomedical device, as well as pharmaceutical and neutriceutical compounds. It will be appreciated that a wide range of additives may be added based upon the biomedical device which is made, and its intended use. Concentrations of components of the reactive mixture are given in weight % of all components in the reaction mixture, excluding diluent. When diluents are used their concentrations are given as weight % based upon the amount of all components in the reaction mixture and the diluent.

As used herein, "polymerizable" means that the compound comprises at least one polymerizable functional group, such as acrylate, methacrylate, acrylamide, methacrylamide, vinyl, N-vinyl lactam, N-vinylamide, and styryl functional groups. "Non-polymerizable" means that the compound does not comprises such a polymerizable functional group.

As used herein, "hydrophilic" means that 1 gm of the compound(s) is soluble in 100 ml of deionized water at 20° C., and in some embodiments 10 gm of the compound(s) is soluble in 100 ml of deionized water at 20° C. "Hydrophobic" means that 1 gram of the compound does not fully dissolve in 100 ml of deionized water at 20° C. The solubility of the compounds can be confirmed by visual observation, with any visible precipitants or turbidity indicating that the compound is hydrophobic. Solubility is beneficially measured after at least about 8 hours of mixing or stirring.

As used herein, the term "alkyl" refers to a hydrocarbon group of from 1 to 20 carbons, unless otherwise indicated.

Silicone Component

A silicone-containing component (or silicone component) is one that contains at least one [—Si—O—Si] group, in a monomer, macromer or prepolymer. In one embodiment, the Si and attached O are present in the silicone-containing component in an amount greater than 20 weight percent, such as greater than 30 weight percent of the total molecular weight of the silicone-containing component. Useful silicone-containing components include polymerizable functional groups such as acrylate, methacrylate, acrylamide, methacrylamide, N-vinyl lactam, N-vinylamide, and styryl functional groups. Examples of silicone-containing components which are useful in this invention may be found in U.S. Pat. Nos. 3,808,178; 4,120,570; 4,136,250; 4,153,641; 4,740,533; 5,034,461; 5,962,548; 5,998,498; and 5,070,215, and European Patent No. 080539.

Suitable silicone-containing components include compounds of Formula I

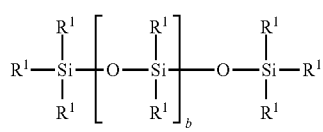

Formula I wherein:

$R^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500 (such as 0 to 100, such as 0 to 20), where it is understood that when b is other than 0, b is a distribution having a mode equal to a stated value; and wherein at least one $R^1$ comprises a monovalent reactive group, and in some embodiments from one to three $R^1$ comprise monovalent reactive groups.

As used herein "monovalent reactive groups" are groups that can undergo free radical and/or cationic polymerization.

Non-limiting examples of free radical reactive groups include (meth)acrylates, styryls, vinyls, vinyl ethers, $C_{1-6}$alkyl(meth)acrylates, (meth)acrylamides, $C_{1-6}$alkyl(meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates and O-vinylcarbonates. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof.

Suitable monovalent alkyl and aryl groups include unsubstituted monovalent $C_1$ to $C_{16}$alkyl groups, $C_6$-$C_{14}$ aryl groups, such as substituted and unsubstituted methyl, ethyl, propyl, butyl, 2-hydroxypropyl, propoxypropyl, polyethyleneoxypropyl, combinations thereof and the like.

In one embodiment b is zero, one $R^1$ is a monovalent reactive group, and at least 3 $R^1$ are selected from monovalent alkyl groups having one to 16 carbon atoms, and in another embodiment from monovalent alkyl groups having one to 6 carbon atoms. Non-limiting examples of silicone components of this embodiment include propenoic acid, -2-methyl-, 2-hydroxy-3-[3-[1,3,3,3-tetramethyl-1-[(trimethylsilyl) oxy]-1-disiloxanyl]propoxy]propyl ester ("SiGMA"; structure in Formula II),

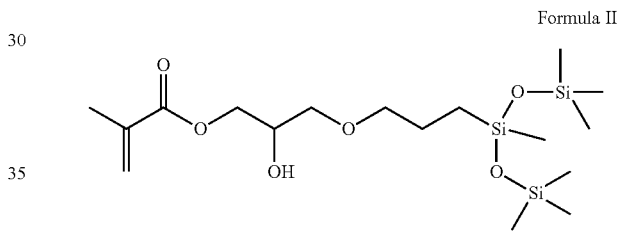

Formula II 2-hydroxy-3-methacryloxypropyloxypropyl-tris(trimethylsiloxy)silane, 3-methacryloxypropyltris(trimethylsiloxy)silane ("TRIS"), 3-methacryloxypropylbis(trimethylsiloxy)methylsilane, and 3-methacryloxypropylpentamethyl disiloxane.

In another embodiment, b is 2 to 20, 3 to 15 or in some embodiments 3 to 10; at least one terminal $R^1$ comprises a monovalent reactive group and the remaining $R^1$ are selected from monovalent alkyl groups having 1 to 16 carbon atoms, and in another embodiment from monovalent alkyl groups having 1 to 6 carbon atoms. In yet another embodiment, b is 3 to 15, one terminal $R^1$ comprises a monovalent reactive group, the other terminal $R^1$ comprises a monovalent alkyl group having 1 to 6 carbon atoms and the remaining $R^1$ comprise monovalent alkyl group having 1 to 3 carbon atoms. Non-limiting examples of silicone components of this embodiment include 3-methacryloxy-2-hydroxypropyloxy propyl butyl terminated polydimethylsiloxane (400-1000 MW)) ("OH-mPDMS"; structure in Formula III),

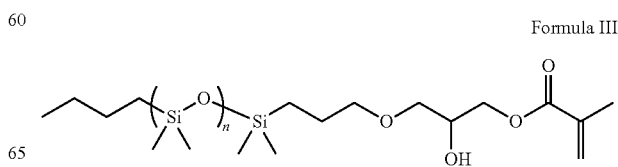

Formula III methacryloxypropyl n-butyl terminated polydimethylsiloxanes (800-1000 MW), ("mPDMS"; structure in Formula IV).

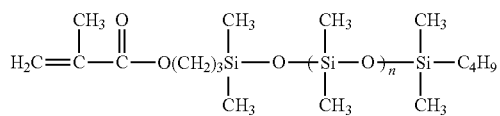

Formula IV

In another embodiment b is 5 to 400 or from 10 to 300, both terminal $R^1$ comprise monovalent reactive groups and the remaining $R^1$ are independently selected from monovalent alkyl groups having 1 to 18 carbon atoms which may have ether linkages between carbon atoms and may further comprise halogen.

In another embodiment, one to four $R^1$ comprises a vinyl carbonate or carbamate of Formula V:

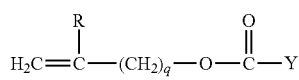

Formula V wherein: Y denotes O—, S— or NH—; R denotes, hydrogen or methyl; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio)propyl-[tris (trimethylsiloxy)silane]; 3-[tris (trimethylsiloxy)silyl]propyl allyl carbamate; 3-[tris (trimethylsiloxy)silyl]propyl vinyl carbamate; trimethylsilylethyl vinyl carbonate; trimethylsilylmethyl vinyl carbonate, and the compound of Formula VI.

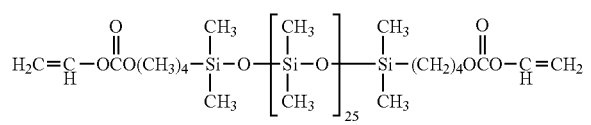

Formula VI

Where biomedical devices with modulii below about 200 are desired, only one $R^1$ shall comprise a monovalent reactive group and no more than two of the remaining $R^1$ groups will comprise monovalent siloxane groups.

Another suitable silicone containing macromer is compound of Formula VII (in which x+y is a number in the range of 10 to 30) formed by the reaction of fluoroether, hydroxy-terminated polydimethylsiloxane, isophorone diisocyanate and isocyanatoethylmethacrylate.

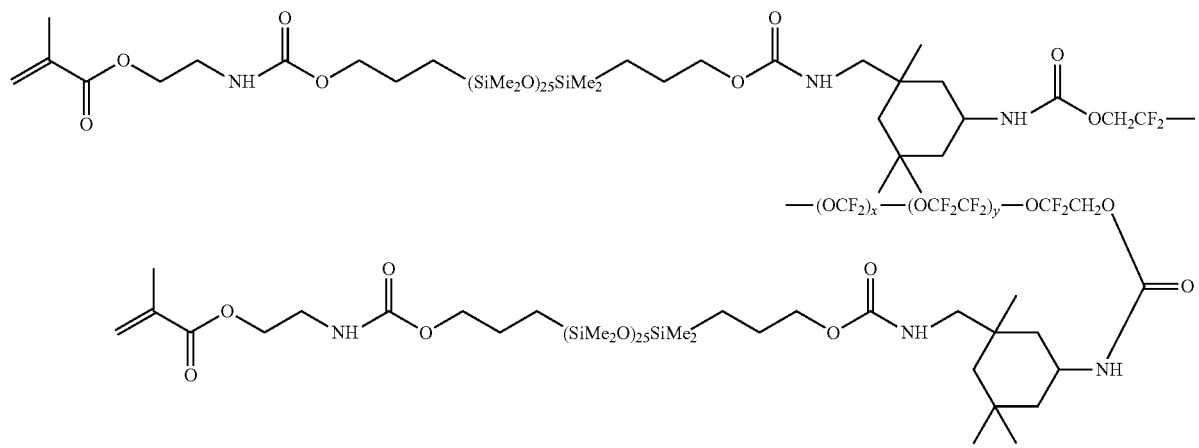

Formula VII

In another embodiment the silicone containing component is selected from acrylamide silicones of US20110237766. Other silicone components suitable for use in this invention include those described is WO 96/31792 such as macromers containing polysiloxane, polyalkylene ether, diisocyanate, polyfluorinated hydrocarbon, polyfluorinated ether and polysaccharide groups. Another class of suitable silicone-containing components includes silicone containing macromers made via GTP, such as those disclosed in U.S. Pat. Nos. 5,314,960, 5,331,067, 5,244,981, 5,371,147 and 6,367,929. U.S. Pat. Nos. 5,321,108; 5,387,662 and 5,539,016 describe polysiloxanes with a polar fluorinated graft or side group having a hydrogen atom attached to a terminal difluoro-substituted carbon atom. US 2002/0016383 describe hydrophilic siloxanyl methacrylates containing ether and siloxanyl linkages and crosslinkable monomers containing polyether and polysiloxanyl groups. Any of the foregoing polysiloxanes can also be used as the silicone-containing component in this invention.

In one embodiment of the present invention where a modulus of less than about 120 psi is desired, the majority of the mass fraction of the silicone-containing components used in the lens formulation should contain only one polymerizable functional group ("monofunctional silicone containing component"). In this embodiment, to insure the desired balance of oxygen transmissibility and modulus it is preferred that all components having more than one polymerizable functional group ("multifunctional components") make up no more than 10 mmol/100 g of the reactive components, and preferably no more than 7 mmol/100 g of the reactive components.

In one embodiment, the silicone component is selected from the group consisting of monomethacryloxypropyl terminated, mono-n-alkyl terminated polydialkylsiloxane; bis- 3-acryloxy-2-hydroxypropyloxypropyl polydialkylsiloxane; methacryloxypropyl-terminated polydialkylsiloxane; mono-(3-methacryloxy-2-hydroxypropyloxy)propyl terminated, mono-alkyl terminated polydialkylsiloxane; and mixtures thereof.

In one embodiment, the silicone component is selected from monomethacrylate terminated polydimethylsiloxanes; bis-3-acryloxy-2-hydroxypropyloxypropyl polydialkylsiloxane; and mono-(3-methacryloxy-2-hydroxypropyloxy)propyl terminated, mono-butyl terminated polydialkylsiloxane; and mixtures thereof.

In one embodiment, the silicone component has an average molecular weight of from about 400 to about 4000 daltons.

The silicone containing component(s) may be present in amounts up to about 95 weight %, and in some embodiments from about 10 and about 80 and in other embodiments from about 20 and about 70 weight %, based upon all reactive components of the reactive mixture (e.g., excluding diluents).

Sulfonic Acid-Containing Component

The reactive mixture contains at least one sulfonic acid-containing component, wherein said sulfonic acid-containing component is comprised of a non-polymerizable hydrophobic cation and a polymerizable sulfonic acid. In one embodiment, the acid is added to the reactive mixture as a salt of a hydrophobic cation. Liquid salts mix readily with the reactive mixture. Solid salts, such as those comprising hydrophobic amines may also be used, so long as they are miscible in the reaction mixture.

The polymerizable sulfonic acid and the non-polymerizable hydrophobic cation may also be added separately to the reactive mixture, and the salt is formed in situ within the reactive mixture. Examples of polymerizable sulfonic acids include, but are not limited to, 2-acrylamido-2-methylpropane sulfonic acid ("AMPS"; structure in Formula VIII), p-styrenesulfonic acid, 2-methacryloyloxyethylsulfonic acid ("2-SEMA"), 3-methacryloyloxy-2-hydroxypropylsulfonic acid, vinylsulfonic acid, and allylsulfonic acid.

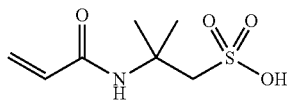

Formula VIII

Incorporating a hydrophobic cation of the present invention decreases the solubility of the polymerizable sulfonic acid, such that the salts may be incorporated into polymerization mixtures which comprise silicone-containing components and polymerized to form polymers which are clear. The sulfonic acid-containing components of the present invention are hydrophobic. Examples of non-polymerizable, hydrophobic cations include amines and ammoniums. Examples of such amines include, but are not limited to, alkyl amines, siloxy alkyl amines, and aryl alkyl amine. Examples of alkyl amines include, but are not limited to, amines comprising 1-3 alkyl groups each independently comprising 1-18 alkyl groups, 1-5 alkyl groups, any of which may further comprise ether groups. Examples include octadecyldimethylamine, tributylamine, trioctylamine, tris(methoxy ethoxyethyl) amine tripentylamine and triethylamine. The alkyl amine may also be tripentylamine and triethylamine. Examples of such ammoniums include, but are not limited to, alkyl ammoniums, siloxy alkyl ammoniums, and aryl alkyl ammoniums. Examples of alkyl ammoniums include those comprising 1-3 alkyl groups each independently comprising 1-18 alkyl groups, 1-5 alkyl groups, any of which may further comprise ether groups.

In one embodiment, following the manufacture of the silicone polymer and/or hydrogel, the non-polymerizable hydrophobic cation can be removed from the sulfonic acid-containing component via an ion exchange with a simple cation such as monovalent sodium, leaving an anionic sulfonic acid-containing component within the silicone polymer and/or hydrogel.

As discussed below in the Examples, the addition of the sulfonic acid-containing component was found to improve the lysozyme uptake and other properties of the resulting silicone polymer, silicone hydrogel, and/or biomedical device (e.g., contact lens).

The sulfonic acid-containing component (e.g., in the form of a salt with a non-polymerizable hydrophobic cation within the reactive mixture or in the form of an anionic sulfonic acid-containing component within the polymer/hydrogel) may be present in a wide range of amounts, depending upon the specific balance of properties desired. For example, the molar ratio of polymerizable sulfonic acid to the hydrophobic cation may be no more than about 1, such as from about 0.2 to about 1, or more preferably from about 0.8 to about 1, or most preferably about 1. The sulfonate group of the sulfonic acid-containing component may be present in a concentration of all components excluding diluent of less than 2 mol/kg, such as from about 0.01 to about 0.2 mol/kg of the polymer, hydrogel (not including water), or reactive mixture (not including diluents). In one embodiment, the concentration of (i) the at least one silicone component and (ii) the sulfonic acid-containing component is less than about 100 mol/kg, such as about 1 to about 50 mol/kg, such as from about 1 to about 10 mol/kg.

Hydrophilic Component

In one embodiment, the reactive mixture may also contain at least one hydrophilic component. In one embodiment, the hydrophilic components can be any of the hydrophilic monomers known to be useful to make hydrogels.

One class of suitable hydrophilic monomers includes acrylic- or vinyl-containing monomers. Such hydrophilic monomers may themselves be used as crosslinking agents, however, where hydrophilic monomers having more than one polymerizable functional group are used, their concentration should be limited as discussed above to provide a contact lens having the desired modulus.

The term "vinyl-type" or "vinyl-containing" monomers refer to monomers containing the vinyl grouping ($-CH=CH_2$) and that are capable of polymerizing. Examples of hydrophilic vinyl-containing monomers include, but are not limited to, monomers such as N-vinyl amides, N-vinyl lactams (e.g. n-vinylpyrrolidone ("NVP")), N-vinyl-N-methyl acetamide, N-vinyl-N-ethyl acetamide, and N-vinyl-N-ethyl formamide, N-vinyl formamide. Alternative vinyl-containing monomers include, but are not limited to, 1-methyl-3-methylene-2-pyrrolidone, 1-methyl-5-methylene-2-pyrrolidone, and 5-methyl-3-methylene-2-pyrrolidone.

"Acrylic-type" or "acrylic-containing" monomers are those monomers containing the acrylic group: ($CH_2=CRCOX$) wherein R is H or $CH_3$, and X is O or N, which are also known to polymerize readily, such as N,N-dimethyl acrylamide ("DMA"), 2-hydroxyethyl methacrylate ("HEMA"), glycerol methacrylate, 2-hydroxyethyl methacrylamide, polyethyleneglycol monomethacrylate, methacrylic acid, mixtures thereof and the like.

Other hydrophilic monomers that can be employed in the invention include, but are not limited to, polyoxyethylene polyols having one or more of the terminal hydroxyl groups replaced with a functional group containing a polymerizable double bond. Examples include polyethylene glycol, ethoxylated alkyl glucoside, and ethoxylated bisphenol A reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Still further examples are the hydrophilic vinyl carbonate or vinyl carbamate monomers disclosed in U.S. Pat. No. 5,070,215 and the hydrophilic oxazolone monomers disclosed in U.S. Pat. No. 4,910,277. Other suitable hydrophilic monomers will be apparent to one skilled in the art.

In one embodiment the hydrophilic component comprises at least one hydrophilic monomer such as DMA, HEMA, glycerol methacrylate, 2-hydroxyethyl methacrylamide, NVP, N-vinyl-N-methyl acrylamide, polyethyleneglycol monomethacrylate, and combinations thereof. In another embodiment, the hydrophilic monomers comprise at least one of DMA, HEMA, NVP and N-vinyl-N-methyl acrylamide and mixtures thereof. In another embodiment, the hydrophilic monomer comprises DMA and/or HEMA.

The hydrophilic component(s) (e.g., hydrophilic monomer(s)) may be present in a wide range of amounts, depending upon the specific balance of properties desired. In one embodiment, the amount of the hydrophilic component is up to about 60 weight %, such as from about 5 and about 40 weight % based upon all reactive components.

Polymerization Initiator

One or more polymerization initiators may be included in the reaction mixture. Examples of polymerization initiators include, but are not limited to, compounds such as lauryl peroxide, benzoyl peroxide, isopropyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphineoxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N,N-dimethylamino)benzoate. Commercially available visible light initiator systems include, but are not limited to, Irgacure 819®, Irgacure 1700®, Irgacure 1800®, Irgacure 1850® (all from Ciba Specialty Chemicals) and Lucirin TPO initiator (available from BASF). Commercially available UV photoinitiators include Darocur 1173 and Darocur 2959 (Ciba Specialty Chemicals). These and other photoinitators which may be used are disclosed in Volume III, Photoinitiators for Free Radical Cationic & Anionic Photopolymerization, $2^{nd}$ Edition by J. V. Crivello & K. Dietliker; edited by G. Bradley; John Wiley and Sons; New York; 1998.

The polymerization initiator is used in the reaction mixture in effective amounts to initiate photopolymerization of the reaction mixture, such as from about 0.1 to about 2 weight %. Polymerization of the reaction mixture can be initiated using the appropriate choice of heat or visible or ultraviolet light or other means depending on the polymerization initiator used. Alternatively, initiation can be conducted without a photoinitiator using, for example, e-beam. However, when a photoinitiator is used, the preferred initiators are bisacylphosphine oxides, such as bis(2,4,6-trimethylbenzoyl)-phenyl phosphine oxide (Irgacure 819®) or a combination of 1-hydroxycyclohexyl phenyl ketone and DMBAPO, and in another embodiment the method of polymerization initiation is via visible light activation.

Internal Wetting Agent

In one embodiment, the reaction mixture includes one or more internal wetting agents. Internal wetting agents may include, but are not limited to, high molecular weight, hydrophilic polymers such as those described in U.S. Pat. Nos. 6,367,929; 6,822,016; 7,786,185; PCT Patent Application Nos. WO03/22321 and WO03/22322, or reactive, hydrophilic polymers such as those described in U.S. Pat. No. 7,249,848. Examples of internal wetting agents include, but are not limited to, polyamides such as poly(N-vinyl pyrrolidone) and poly (N-vinyl-N-methyl acetamide).

The internal wetting agent(s) may be present in a wide range of amounts, depending upon the specific parameter desired. In one embodiment, the amount of the wetting agent(s) is up to about 50 weight %, such as from about 5 and about 40 weight %, such as from about 6 to about 30 weight % based upon all reactive components.

Other Components

Other components that can be present in the reaction mixture used to form the contact lenses of this invention include, but are not limited to, compatibilizing components (such as those disclosed in US Patent Application Nos. 2003/162862 and 2003/125498), ultra-violet absorbing compounds, medicinal agents, antimicrobial compounds, copolymerizable and nonpolymerizable dyes, release agents, reactive tints, pigments, combinations thereof and the like. In one embodiment, the sum of additional components may be up to about 20 wt %.

Diluents

In one embodiment, the reactive components (e.g., silicone containing component, 2-hydroxyethyl acrylamide, hydrophilic monomers, wetting agents, and/or other components) are mixed together either with or without a diluent to form the reaction mixture.

In one embodiment a diluent is used having a polarity sufficiently low to solubilize the non-polar components in the reactive mixture at reaction conditions. One way to characterize the polarity of the diluents of the present invention is via the Hansen solubility parameter, $\delta p$. In certain embodiments, the $\delta p$ is less than about 10, and preferably less than about 6. Suitable diluents are further disclosed in US Patent Application No. 20100280146 and U.S. Pat. No. 6,020,445.

Classes of suitable diluents include, without limitation, alcohols having 2 to 20 carbons, amides having 10 to 20 carbon atoms derived from primary amines, ethers, polyethers, ketones having 3 to 10 carbon atoms, and carboxylic acids having 8 to 20 carbon atoms. As the number of carbons increase, the number of polar moieties may also be increased to provide the desired level of water miscibility. In some embodiments, primary and tertiary alcohols are preferred. Preferred classes include alcohols having 4 to 20 carbons and carboxylic acids having 10 to 20 carbon atoms.

In one embodiment, the diluents are selected from 1,2-octanediol, t-amyl alcohol, 3-methyl-3-pentanol, decanoic acid, 3,7-dimethyl-3-octanol, 2-methyl-2-pentanol, 2-ethyl-1-butanol, 3,3-dimethyl-2-butanol, tripropylene methyl ether (TPME), butoxy ethyl acetate, mixtures thereof and the like.

In one embodiment, the diluents are selected from those that have some degree of solubility in water. In some embodiments at least about three percent of the diluent is miscible water. Examples of water soluble diluents include, but are not limited to, 1-octanol, 1-pentanol, 1-hexanol, 2-hexanol, 2-octanol, 3-methyl-3-pentanol, 2-pentanol, t-amyl alcohol, tent-butanol, 2-butanol, 1-butanol, ethanol, decanoic acid, octanoic acid, dodecanoic acid, 1-ethoxy-2-propanol, 1-tert-butoxy-2-propanol, EH-5 (commercially available from Ethox Chemicals), 2,3,6,7-tetrahydroxy-2,3,6,7-tetramethyl octane, 9-(1-methylethyl)-2,5,8,10,13,16-hexaoxaheptadecane, 3,5,7,9,11,13-hexamethoxy-1-tetradecanol, mixtures thereof and the like.

Curing of Silicone Polymer/Hydrogel and Manufacture of Lens

The reactive mixture of the present invention may be cured via any known process for molding the reaction mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197,266. In one embodiment, the contact lenses of this invention are formed by the direct molding of the silicone hydrogels, which is economical, and enables precise control over the final shape of the hydrated lens. For this method, the reaction mixture is placed in a mold having the shape of the final desired silicone hydrogel and the reaction mixture is subjected to conditions whereby the monomers polymerize, to thereby produce a polymer in the approximate shape of the final desired product.

In one embodiment, after curing, the lens is subjected to extraction to remove unreacted components and release the lens from the lens mold. The extraction may be done using conventional extraction fluids, such organic solvents, such as alcohols or may be extracted using aqueous solutions.

Aqueous solutions are solutions which comprise water. In one embodiment the aqueous solutions of the present invention comprise at least about 30 weight % water, in some embodiments at least about 50 weight % water, in some embodiments at least about 70% water and in others at least about 90 weight % water. Aqueous solutions may also include additional water soluble components such as release agents, wetting agents, slip agents, pharmaceutical and neutriceutical components, combinations thereof and the like. Release agents are compounds or mixtures of compounds which, when combined with water, decrease the time required to release a contact lens from a mold, as compared to the time required to release such a lens using an aqueous solution that does not comprise the release agent. In one embodiment the aqueous solutions comprise less than about 10 weight %, and in others less than about 5 weight % organic solvents such as isopropyl alcohol, and in another embodiment are free from organic solvents. In these embodiments the aqueous solutions do not require special handling, such as purification, recycling or special disposal procedures.

In various embodiments, extraction can be accomplished, for example, via immersion of the lens in an aqueous solution or exposing the lens to a flow of an aqueous solution. In various embodiments, extraction can also include, for example, one or more of: heating the aqueous solution; stirring the aqueous solution; increasing the level of release aid in the aqueous solution to a level sufficient to cause release of the lens; mechanical or ultrasonic agitation of the lens; and incorporating at least one leach aid in the aqueous solution to a level sufficient to facilitate adequate removal of unreacted components from the lens. The foregoing may be conducted in batch or continuous processes, with or without the addition of heat, agitation or both.

Some embodiments can also include the application of physical agitation to facilitate leach and release. For example, the lens mold part to which a lens is adhered, can be vibrated or caused to move back and forth within an aqueous solution. Other embodiments may include ultrasonic waves through the aqueous solution.

The lenses may be sterilized by known means such as, but not limited to autoclaving.

Contact Lens Properties

It will be appreciated that all of the tests specified herein have a certain amount of inherent test error. Accordingly, results reported herein are not to be taken as absolute numbers, but numerical ranges based upon the precision of the particular test.

Uptake of Lysozyme

Lysozyme uptake was measured as follows: The lysozyme solution used for the lysozyme uptake testing contained lysozyme from chicken egg white (Sigma, L7651) solubilized at a concentration of 2 mg/ml in phosphate saline buffer supplemented by Sodium bicarbonate at 1.37 g/l and D-Glucose at 0.1 g/l.

Three lenses for each example were tested using each protein solution, and three were tested using PBS as a control solution. The test lenses were blotted on sterile gauze to remove packing solution and aseptically transferred, using sterile forceps, into sterile, 24 well cell culture plates (one lens per well) each well containing 2 ml of lysozyme solution. Each lens was fully immersed in the solution. 2 ml of the lysozyme solution was placed in a well without a contact lens as a control.

The plates containing the lenses and the control plates containing only protein solution and the lenses in the PBS, were parafilmed to prevent evaporation and dehydration, placed onto an orbital shaker and incubated at 35° C., with agitation at 100 rpm for 72 hours. After the 72 hour incubation period the lenses were rinsed 3 to 5 times by dipping lenses into three (3) separate vials containing approximately 200 ml volume of PBS. The lenses were blotted on a paper towel to remove excess PBS solution and transferred into sterile conical tubes (1 lens per tube), each tube containing a volume of PBS determined based upon an estimate of lysozyme uptake expected based upon on each lens composition. The lysozyme concentration in each tube to be tested needs to be within the albumin standards range as described by the manufacturer (0.05 microgram to 30 micrograms). Samples were diluted 5 times.

Lysozyme uptake was determined using on-lens bicinchoninic acid method using QP-BCA kit (Sigma, QP-BCA) following the procedure described by the manufacturer (the standards prep is described in the kit) and is calculated by subtracting the optical density measured on PBS soaked lenses (background) from the optical density determined on lenses soaked in lysozyme solution.

Optical density was measured using a Synergy II Microplate reader capable for reading optical density at 562 nm.

Polyquaternary 1 (PQ1) Uptake

PQ1 uptake was measured as follows: PQ1 uptake was measured as follows. The HPLC is calibrated using a series of standard PQ1 solutions prepared having the following concentrations: 2, 4, 6, 8, 12 and 15 µg/mL. Lenses were placed into polypropylene contact lens case with 3 mL of Optifree Replenish (which contains 0.001 wt % PQ1, 0.56% citrate dihydrate and 0.021% citric acid monohydrate (wt/wt)). and is commercially available from Alcon). A control lens case, containing 3 mL of solution, but no contact lens was also prepared. The lenses and control solutions were allowed to sit at room temperature for 24 hours. 1 ml of solution was removed from each of the samples and controls and mixed with trifluoroacetic acid (10 μL). The analysis was conducted using HPLC/ELSD and a Phenomenex Luna C4 (4.6 mm×5 mm; 5 μm particle size) column and the following conditions
Instrument: Agilent 1200 HPLC or equivalent with Sedere Sedex 85 ELSD
Sedex 85 ELSD: T=60° C., Gain=10, Pressure=3.4 bar, Filter=1 s
Mobile Phase A: $H_2O$ (0.1% TFA)
Mobile Phase B: Acetonitrile (0.1% TFA)
Column Temperature: 40° C.
Injection Volume: 100 μL

| HPLC Conditions | | | |
|---|---|---|---|
| Time (minutes) | % A | % B | Flow Rate (mL/min) |
| 0.00 | 100 | 0 | 1.2 |
| 1.00 | 100 | 0 | 1.2 |
| 5.00 | 0 | 100 | 1.2 |
| 8.50 | 0 | 100 | 1.2 |
| 8.60 | 100 | 0 | 1.2 |
| 12.00 | 100 | 0 | 1.2 |

Three lenses were run for each analysis, and the results were averaged. PQ1 uptake is reported as the percentage loss of PQ1 after soak with lens compared to the PQ1 present in the control without lens.

Water Content

Water content is measured as follows. The lenses to be tested are allowed to sit in packing solution for 24 hours. Each of three test lens are removed from packing solution using a sponge tipped swab and placed on blotting wipes which have been dampened with packing solution. Both sides of the lens are contacted with the wipe. Using tweezers, the test lens are placed in a weighing pan and weighed. The two more sets of samples are prepared and weighed as above. The pan and lenses are weighed three times and the average is the wet weight.

The dry weight is measured by placing the sample pans in a vacuum oven which has been preheated to 60° C. for 30 minutes. Vacuum is applied until at least 0.4 inches Hg is attained. The vacuum valve and pump are turned off and the lenses are dried for four hours. The purge valve is opened and the oven is allowed reach atmospheric pressure. The pans are removed and weighed. The water content is calculated as follows:

Wet weight=combined wet weight of pan and lenses− weight of weighing pan

Dry weight=combined dry weight of pan and lens− weight of weighing pan $$\% \text{ water content} = \frac{(\text{wet weight} - \text{dry weight})}{\text{wet weight}} \times 100$$

The average and standard deviation of the water content are calculated for the samples are reported. In one embodiment, the % water content is from about 20 to 70%, such as from about 30 to 65%

EXAMPLES

These examples do not limit the invention. They are meant only to suggest a method of practicing the invention. Those knowledgeable in contact lenses as well as other specialties may find other methods of practicing the invention. The following abbreviations are used in the examples below:

AMPS 2-Acrylamido-2-methylpropane sulfonic acid
AMPS SALT Tripentylammonium salt of 2-Acrylamido-2-methylpropane sulfonic acid as described below in Example 1
Blue HEMA the reaction product of Reactive Blue 4 and HEMA, as described in Example 4 of U.S. Pat. No. 5,944,853
CGI 403 bis(2,6-dimethoxybenzoyl)(2,4,4-trimethylpentyl) phosphine oxide
D30 3,7-dimethyl-3-octanol
DMA N,N-dimethylacrylamide
HEMA 2-hydroxyethyl methacrylate
Irgacure 819 bis(2,4,6-trimethylbenzoyl)-phenylphosphineoxide
Irgacure 184 1-hydroxycyclohexyl-phenylketone
mPDMS 1000 monomethacryloxypropyl terminated mono-n-butyl terminated polydimethylsiloxane (Mn=800 to 1000 g/mol)
Norbloc 2-(2'-hydroxy-5-methacrylyloxyethylphenyl)-2H-benzotriazole
OH-mPDMS α-(2-hydroxy-1-methacryloxypropyloxypropyl)-ω-butyl-octamethylpentasiloxane, (MW 612 g/mol), prepared as in Example 8 of US20100249356 A1
PVP poly(N-vinyl pyrrolidone) (K values noted)
2-SEMA 2-methacryloyloxyethylsulfonic acid
SiGMA 2 propenoic acid, 2-methyl-, 2 hydroxy-3-[3-[1,3,3,3-tetramethyl-1-[(trimethylsilyl)oxy]disiloxanyl]propoxy]propyl ester
TEGDMA tetraethyleneglycol dimethacrylate

Example 1

Synthesis of Tripentylamine Salt of AMPS

To a stirred solution of 2.27 g of tripentylamine and 50 ml of ethyl acetate, 2.07 g of AMPS was added and allowed to continue to stir for 3 hrs. The ethyl acetate was removed on a rotary evaporator to yield a slight yellow liquid. This liquid was then washed with hexane in a separation funnel. The residual hexane was removed on a rotary evaporator yielding the tripentylammonium salt as a slight yellow ionic liquid ("AMPS Salt").

The resulting ionic liquid appeared to remain stable for several days, but became visually more viscous after several weeks of storage at 5° C.

Example 2

Manufacture of Silicone Hydrogel Formulations with AMPS Salt

The AMPS Salt prepared in Example 1 was used to prepare the formulation blends in Table 1. For each blend, all components were added and mixed on a jar roller until everything had dissolved. Both blends were clear.

TABLE 1

| Blend Formulations | | |
|---|---|---|
| Component | Blend 1 wt % | Blend 2 wt % |
| OH-mPDMS | 26.01 | 26.01 |
| mPDMS 1000 | 28.01 | 28.01 |
| DMA | 21.00 | 21.00 |

TABLE 1-continued

Blend Formulations

| Component | Blend 1 wt % | Blend 2 wt % |
|---|---|---|
| PVP K-90 | 7.00 | 7.00 |
| HEMA | 6.50 | 6.50 |
| TEGDMA | 1.50 | 1.50 |
| AMPS SALT* | 7.50 | 7.50 |
| Norbloc | 2.00 | 2.00 |
| Irgacure 819 | 0.48 | 0.48 |
| Decanoic acid (diluent)** | 9.20 | 0 |
| t-amyl alcohol (diluent)** | 13.80 | 0 |
| D30 (diluent)** | 0 | 23 |
| AMPS Concentration (mol/kg)*** | 0.18 | 0.18 |

*Note: The tripentylamine portion of the AMPS Salt was washed out of the polymer during hydration but is not calculated as part of the diluent in these blends.
**Amounts of diluents are shown as weight percent of combination of all components. Amounts of other components are shown as weight percent of reactive components, excluding diluents.
***AMPS concentration is reported as moles of AMPS monomer per kilogram of reactive monomer mix, excluding diluents. For this calculation, the tripentylamine portion of the AMPS salt was included as part of the diluent. Both Blend 1 and Blend 2 have an AMPS concentration (excluding diluents and the tripentylamine portion) of 3 mol/kg and a ratio of silicone components to AMPS of 3:1.

Example 3

Manufacture of Silicone Hydrogel Formulations with AMPS without Non-Polymerizable Hydrophobic Amine A blend was prepared as shown below in Table 2. The acid form of AMPS was first dissolved in the hydrophilic monomers (DMA, HEMA and TEGDMA) by mixing overnight on ajar roller. The rest of the components were then added and mixed on ajar roller. After 6 days of mixing on the jar roller, blend 3 remained hazy and contained lumps of phase separated material. These results demonstrate the need to use AMPS as a salt with a non-polymerizable hydrophobic amine when manufacturing a silicone polymer/hydrogel.

TABLE 2

Blend Formulations

| Component | Blend 3 wt % |
|---|---|
| DMA | 23.75 |
| Blue HEMA | 0.00 |
| HEMA | 6.00 |
| TEGDMA | 1.50 |
| SiGMA | 27.86 |
| mPDMS 1000 | 30.81 |
| Norbloc | 2.00 |
| CGI 403 | 0.24 |
| Irgacure 184 | 0.24 |
| PVP K90 | 7.00 |
| AMPS | 0.60 |
| D30 (diluent)* | 23.00 |
| AMPS Concentration (mol/kg) | 0.03 |

*Amounts of diluents are shown as weight percent of combination of all components. Amounts of other components are shown as weight percent of reactive components, excluding diluents.

Example 4

Manufacture of Silicone Hydrogel Formulations with AMPS Salt Formed in situ in the Reactive Mixture A series of blends were prepared as shown below in Table 3. The AMPS and tripentylamine were first dissolved in hydrophilic monomers (DMA and HEMA) by mixing on ajar roller. The rest of the components were then added and mixed on ajar roller overnight. All blends were clear blue and without phase separation.

TABLE 3

Blend Formulations

| Component | Blend 4 wt % | Blend 5 wt % | Blend 6 wt % | Blend 7 wt % | Blend 8 wt % | Blend 9 wt % | Blend 10 wt % |
|---|---|---|---|---|---|---|---|
| DMA | 24.00 | 23.85 | 23.75 | 23.55 | 23.20 | 22.59 | 22.40 |
| Blue HEMA | 0.02 | 0.02 | 0.02 | 0.02 | 0.02 | 0.02 | 0.02 |
| HEMA | 6.00 | 6.00 | 6.00 | 6.00 | 6.00 | 6.00 | 6.00 |
| TEGDMA | 1.50 | 1.50 | 1.50 | 1.50 | 1.50 | 1.50 | 1.50 |
| SiGMA | 28.00 | 27.95 | 27.85 | 27.75 | 27.50 | 27.50 | 27.00 |
| mPDMS 1000 | 31.00 | 30.90 | 30.80 | 30.50 | 30.50 | 30.50 | 30.00 |
| Norbloc | 2.00 | 2.00 | 2.00 | 2.00 | 2.00 | 2.00 | 2.00 |
| CGI 403 | 0.24 | 0.24 | 0.24 | 0.24 | 0.24 | 0.24 | 0.24 |
| Irgacure 184 | 0.24 | 0.24 | 0.24 | 0.24 | 0.24 | 0.24 | 0.24 |
| PVP K90 | 7.00 | 7.00 | 7.00 | 7.00 | 7.00 | 7.00 | 7.00 |
| AMPS | 0.00 | 0.30 | 0.60 | 1.20 | 1.80 | 2.41 | 3.60 |
| D30 (diluent)* | 23.00 | 22.74 | 22.49 | 21.98 | 21.47 | 20.96 | 19.95 |
| Tripentylamine (diluent)* | 0.00 | 0.26 | 0.51 | 1.02 | 1.53 | 1.99 | 3.05 |
| AMPS (mol/kg)** | 0.00 | 0.01 | 0.03 | 0.06 | 0.09 | 0.12 | 0.17 |

*Amounts of diluents are shown as weight percent of combination of all components. Amounts of other components are shown as weight percent of reactive components, excluding diluents.
**Amount of AMPS is shown as the number of moles per kg of formulation, excluding diluent

Example 5

Manufacture of Silicone Hydrogel Formulations with 2-SEMA Salt Formed in Situ in the Reactive Mixture A series of blends were prepared as shown below in Table 4. The 2-SEMA and tripentylamine were first dissolved in hydrophilic monomers (DMA and HEMA) by mixing on ajar roller. The rest of the components were then added and mixed on ajar roller overnight. All blends were clear blue and without phase separation.

TABLE 4

Blend Formulations

| Component | Blend 11 wt % | Blend 12 wt % | Blend 13 wt % | Blend 14 wt % | Blend 15 wt % | Blend 16 wt % |
|---|---|---|---|---|---|---|
| DMA | 23.88 | 23.75 | 23.67 | 23.10 | 22.64 | 22.61 |
| Blue HEMA | 0.02 | 0.02 | 0.02 | 0.02 | 0.02 | 0.02 |
| HEMA | 6.00 | 6.00 | 6.00 | 6.00 | 6.00 | 6.00 |
| TEGDMA | 1.50 | 1.50 | 1.50 | 1.50 | 1.50 | 1.50 |
| SiGMA | 27.93 | 27.87 | 27.60 | 27.60 | 27.55 | 27.00 |
| mPDMS 1000 | 30.91 | 30.81 | 30.60 | 30.60 | 30.50 | 30.00 |
| Norbloc | 2.00 | 2.00 | 2.00 | 2.00 | 2.00 | 2.00 |
| CGI 403 | 0.24 | 0.24 | 0.24 | 0.24 | 0.24 | 0.24 |
| Irgacure 184 | 0.24 | 0.24 | 0.24 | 0.24 | 0.24 | 0.24 |
| PVP K90 | 7.00 | 7.00 | 7.00 | 7.00 | 7.00 | 7.00 |
| 2-SEMA | 0.28 | 0.57 | 1.13 | 1.70 | 2.26 | 3.39 |
| D30 (diluent)* | 22.74 | 22.49 | 21.98 | 21.47 | 20.96 | 19.95 |
| Tripentylamine (diluent)* | 0.26 | 0.51 | 1.02 | 1.53 | 1.99 | 3.05 |
| 2-SEMA (mol/kg)** | 0.01 | 0.03 | 0.06 | 0.09 | 0.12 | 0.18 |

*Amounts of diluents are shown as weight percent of combination of all components. Amounts of other components are shown as weight percent of reactive components, excluding diluents.
**Amount of AMPS is shown as the number of moles per kg of formulation, excluding diluent

Example 6

Manufacture of Hydrogel Contact Lens

Blends 1, 2 and 4-16 were placed in a glass vials with caps removed and placed under vacuum for 15 minutes to remove oxygen. Plastic contact lens molds were filled with one of the blends in the nitrogen-filled glove box. Formulations were cured in the nitrogen-filled glove box for 15 minutes at 60° C. and 1.5 mW/cm2 using Philips TL03 20 W fluorescent bulbs. The lenses were leached as follows: first, in a 70% isopropanol:30% DI water for 2 hours; then in 0.025M Sodium Carbonate for 3 hours (to deprotonate the tripentylamine and exchange for sodium cation); then 70% isopropanol:30% DI water for12 hours (to remove tripentylamine); and lastly 48 hours in DI water. Lenses were then placed in lens vials with borate buffered packing solution and sterilized in a autoclave using a 30 minute cycle.

Example 7

Mechanical Property Testing

The resulting lenses of Example 6 were submitted for Water Content, PQ1 Uptake, and/or Lysozyme testing to determine the effect of the addition of various percent amounts of AMPS on such lens properties. The results are depicted in Tables 7 and 8 ("NT" indicates that the lens was not tested and "N/A" indicates the item is not applicable).

TABLE 5

Various Lens Properties

| | Blend 1 | Blend 2 | Blend 4 | Blend 5 | Blend 6 | Blend 7 | Blend 8 | Blend 9 |
|---|---|---|---|---|---|---|---|---|
| Ionic Monomer | AMPS | AMPS | N/A | AMPS | AMPS | AMPS | AMPS | AMPS |
| Ionic Monomer Concentration (mol/kg)* | 0.18 | 0.18 | N/A | 0.01 | 0.03 | 0.06 | 0.09 | 0.12 |
| Water content (%) | 54.8 | 53.7 | 39.7 | NT | NT | 45.7 | NT | 51.1 |
| PQ1 Uptake (%) | NT | NT | −1 | 4 | 6 | −4 | 13 | 80 |
| Lysozyme (μg/lens) | 163 | 172 | 5 | 102 | 150 | 170 | 176 | 175 |

*Ionic Monomer concentration is reported as moles of ionic monomer per kilogram of reactive monomer mix, excluding diluent. Tripentylamine is included as a diluent in all formulations.

TABLE 6

Various Lens Properties

| | Blend 10 | Blend 11 | Blend 12 | Blend 13 | Blend 14 | Blend 15 | Blend 16 |
|---|---|---|---|---|---|---|---|
| Ionic Monomer | AMPS | 2-SEMA | 2-SEMA | 2-SEMA | 2-SEMA | 2-SEMA | 2-SEMA |
| Ionic Monomer Concentration (mol · kg)* | 0.17 | 0.01 | 0.03 | 0.06 | 0.09 | 0.12 | 0.18 |
| Water content (%) | 57.0 | NT | NT | 43.7 | NT | 50.0 | 53.4 |
| PQ1 Uptake (%) | 80 | 12 | 6 | 0 | 34 | 74 | 79 |
| Lysozyme (μg /lens) | 176 | 66 | 117 | 129 | 148 | 133 | 136 |

*Ionic Monomer concentration is reported as moles of ionic monomer per kilogram of reactive monomer mix, excluding diluent. Tripentylamine is included as a diluent in all formulations.

These results in Table 5 and 6 show the addition of the sulfonic acid-containing component (i.e., AMPS or 2-SEMA) into the silicone hydrogel contact lens (i.e., the lens manufactured with Blends 1-2 and 5-16) increased the uptake of lysozyme into the contact lens as compared to the silicone hydrogel contact lens without such sulfonic acid-containing component (i.e., the lens manufactured with Blend 4).

PQ1 Uptake is reported for Blends 4-16 in Tables 5 and 6. PQ1 is a preservative used in many commercially available contact lens care cleaning solutions. PQ1 is known to cause ocular discomfort and corneal staining and so its uptake into the lens is not desirable.

It is understood that while the invention has been described in conjunction with the detailed description thereof, that the foregoing description is intended to illustrate and not limit the scope of the invention, which is defined by the scope of the appended claims. Other aspects, advantages, and modifications are within the claims.

The invention claimed is:

1. A process for forming a silicone polymer comprising a sulfonic acid component comprising (a) polymerizing reactive components comprising (i) at least one silicone component and (ii) at least one sulfonic acid-containing component, wherein said sulfonic acid-containing component is comprised of a non-polymerizable, hydrophobic cation and a polymerizable sulfonic acid; and (b) removing the non-polymerizable, hydrophobic cation from said silicone polymer.

2. The process of claim 1, wherein said polymerizable sulfonic acid is selected from the group consisting of 2-acrylamido-2-methylpropane sulfonic acid, p-styrenesulfonic acid, 2-methacryloyloxyethylsulfonic acid, 3-methacryloyloxy-2-hydroxypropylsulonic acid, allylsulfonic acid, 3-methacryloyloxypropylsulfonic acid, vinylsulfonic acid, and combinations thereof.

3. The process of claim 1, wherein said hydrophobic cation is selected from the group consisting of alkyl amines, siloxy alkyl amines, and aryl alkyl amine.

4. The process of claim 1, wherein at least one silicone component is selected from compounds of Formula I:

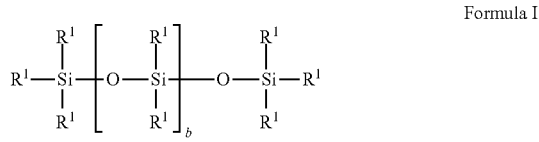

Formula I wherein:
R$^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500, where it is understood that when b is other than 0, b is a distribution having a mode equal to a stated value; and wherein at least one R$^1$ comprises a monovalent reactive group.

5. The process of claim 1 wherein said at least one silicone component is selected from the group consisting of methacryloxypropyl terminated, mono-n-alkyl terminated polydialkylsiloxane; bis-3-acryloxy-2-hydroxypropyloxypropyl polydialkylsiloxane; methacryloxypropyl-terminated polydialkylsiloxane; mono-(3-methacryloxy-2-hydroxypropyloxy)propyl terminated, mono-alkyl terminated polydialkylsiloxane; and mixtures thereof.

6. The process of claim 1 wherein said at least one silicone component is selected from monomethacrylate terminated polydimethylsiloxanes; bis-3-acryloxy-2-hydroxypropyloxypropyl polydialkylsiloxane; mono-(3-methacryloxy-2-hydroxypropyloxy)propyl terminated, mono-butyl terminated polydialkylsiloxane; and mixtures thereof.

7. A silicone polymer The process of claim 1, wherein said at least one silicone component comprises 3-methacryloxy-2-hydroxypropyloxy-n-butyl terminated polydialkylsiloxane.

8. The process of claim 1, wherein said reactive components further comprise at least one non-ionic hydrophilic acrylic-containing monomer.

9. The process of claim 7, wherein said at least one non-ionic hydrophilic acrylic-containing monomer comprises HEMA, DMA and mixtures thereof.

10. A silicone polymer The process of claim 1, wherein the ratio of (i) said at least one silicone component and (ii) said sulfonic acid-containing component is less than about 100 mol/kg.

11. The process of claim 1 wherein said silicone polymer comprises a silicone hydrogel.

12. The process of claim 1, wherein the sulfonate group of the at least one sulfonic acid-containing component is present in a concentration to all components excluding diluent of less than 2 mol/kg.

13. The process of claim 1, wherein the reaction mixture further comprises a polyamide.

14. The process of claim 1 wherein said silicone polymer is a contact lens.

15. A The process of claim 11 wherein said silicone hydrogel is a contact lens.

16. The process of claim 14 wherein said contact lens has a lysozyme uptake of at least 50 µg per lens.

17. A The process of claim 14 wherein said contact lens has a lysozyme uptake of at least 50 µg per lens.

18. The process of claim 1 wherein said silicone polymer is a biomedical device.

19. The process of claim 11 wherein said silicone polymer is a biomedical device.

* * * * *

UNITED STATES PATENT AND TRADEMARK OFFICE
CERTIFICATE OF CORRECTION

| | | |
|---|---|---|
| PATENT NO. | : 8,940,812 B2 | Page 1 of 1 |
| APPLICATION NO. | : 13/734775 | |
| DATED | : January 27, 2015 | |
| INVENTOR(S) | : Reboul et al. | |

It is certified that error appears in the above-identified patent and that said Letters Patent is hereby corrected as shown below:

In the Claims

Claim 7, Column 20, Line 23
Please correct: "A silicone polymer The process of claim 1, wherein said"
To read: -- The process of claim 1, wherein said --

Claim 10, Column 20, Line 33
Please correct: "A silicone polymer The process of claim 1, wherein the"
To read: -- The process of claim 1, wherein the --

Claim 15, Column 20, Line 47
Please correct: "A The process of claim 11 wherein said silicone hydro-"
To read: -- The process of claim 11 wherein said silicone hydro- --

Claim 17, Column 20, Line 51
Please correct: "A The process of claim 14 wherein said contact lens has"
To read: -- The process of claim 14 wherein said contact lens has --

Signed and Sealed this
Eighteenth Day of August, 2015

Michelle K. Lee
*Director of the United States Patent and Trademark Office*